United States Patent
Zhang et al.

(10) Patent No.: US 12,196,917 B2
(45) Date of Patent: Jan. 14, 2025

(54) IMAGING LENS, PHOTOGRAPHING MODULE, AND ELECTRONIC DEVICE

(71) Applicant: JIANGXI JINGCHAO OPTICAL CO., LTD., Nanchang (CN)

(72) Inventors: Wenyan Zhang, Nanchang (CN); Hairong Zou, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 587 days.

(21) Appl. No.: 17/605,537

(22) PCT Filed: Jun. 28, 2019

(86) PCT No.: PCT/CN2019/093780
§ 371 (c)(1),
(2) Date: Oct. 21, 2021

(87) PCT Pub. No.: WO2020/258269
PCT Pub. Date: Dec. 30, 2020

(65) Prior Publication Data
US 2022/0196987 A1    Jun. 23, 2022

(51) Int. Cl.
G02B 13/00    (2006.01)
G02B 9/12    (2006.01)
G02B 13/02    (2006.01)

(52) U.S. Cl.
CPC ........... G02B 13/0035 (2013.01); G02B 9/12 (2013.01); G02B 13/0065 (2013.01); G02B 13/02 (2013.01)

(58) Field of Classification Search
CPC ...... G02B 9/12; G02B 13/02; G02B 13/0065; G02B 13/0035
See application file for complete search history.

(56) References Cited

U.S. PATENT DOCUMENTS 4,981,344 A    1/1991    Ueda
5,204,780 A *    4/1993    Sakamoto ............ 359/690
(Continued)

FOREIGN PATENT DOCUMENTS

CN    1206842 A    2/1999
CN    1297164 A    5/2001
(Continued)

OTHER PUBLICATIONS

MIL-HDBK-141 Military Standardization Handbook Optical Design, Oct. 1962, p. 8-15 (Year: 1962).*
(Continued)

*Primary Examiner* — George G. King
*Assistant Examiner* — Anna Smith
(74) *Attorney, Agent, or Firm* — Franklin & Associates International Inc; Matthew F. Lambrinos

(57) ABSTRACT

An imaging lens (100). The imaging lens (100) sequentially consists of, from the object side to the image side: a first lens (L1) having refraction power, the object side surface (S1) of the first lens (L1) being a convex surface at the optic axis; a second lens (L2) having refraction power, the object side surface (S3) of the second lens (L2) being a convex surface at the optic axis; and a third lens (L3) having refraction power. The imaging lens (100) satisfies the condition that FNO*L>15.5, wherein FNO represents an f-number of the imaging lens (100), L represents an aperture diameter of the first lens (L1), and the unit of L is mm.

19 Claims, 7 Drawing Sheets

(56) References Cited

U.S. PATENT DOCUMENTS

| | | | |
|---|---|---|---|
| 6,414,800 B1 | 7/2002 | Hamano | |
| 6,985,309 B2 | 1/2006 | Shinohara | |
| 9,057,868 B1 | 6/2015 | Chung et al. | |
| 11,988,945 B2* | 5/2024 | Hsu | G03B 17/17 |
| 2004/0218285 A1 | 11/2004 | Amanai | |
| 2004/0264003 A1 | 12/2004 | Noda | |
| 2005/0046970 A1 | 3/2005 | Amanai | |
| 2006/0274426 A1* | 12/2006 | Sueyoshi | G02B 13/009 359/676 |
| 2007/0031134 A1* | 2/2007 | Kuroda | G02B 13/007 396/55 |
| 2008/0062538 A1* | 3/2008 | Liao | G02B 17/0856 359/720 |
| 2008/0106801 A1 | 5/2008 | Kang et al. | |
| 2010/0254029 A1 | 10/2010 | Shinohara | |
| 2012/0075718 A1 | 3/2012 | Seo | |
| 2014/0063620 A1 | 3/2014 | Jung et al. | |
| 2015/0138425 A1 | 5/2015 | Lee | |
| 2016/0124192 A1 | 5/2016 | Koreeda | |
| 2016/0161709 A1 | 6/2016 | Hsueh et al. | |
| 2017/0307858 A1 | 10/2017 | Chen | |
| 2018/0059365 A1* | 3/2018 | Bone | G02B 27/0025 |
| 2018/0081149 A1* | 3/2018 | Bae | G02B 7/021 |
| 2018/0113282 A1 | 4/2018 | Tsai | |
| 2019/0162939 A1* | 5/2019 | Saito | G03B 5/00 |
| 2020/0073092 A1 | 3/2020 | Chen | |
| 2020/0333561 A1* | 10/2020 | Liu | G02B 13/02 |
| 2021/0018725 A1* | 1/2021 | Hsu | G02B 13/0065 |
| 2021/0048630 A1* | 2/2021 | Liao | G02B 13/0045 |

FOREIGN PATENT DOCUMENTS

| | | |
|---|---|---|
| CN | 101093274 A | 12/2007 |
| CN | 101983348 A | 3/2011 |
| CN | 102132189 A | 7/2011 |
| CN | 102419470 A | 4/2012 |
| CN | 102466864 A | 5/2012 |
| CN | 202522758 U | 11/2012 |
| CN | 102914851 A | 2/2013 |
| CN | 102985865 A | 3/2013 |
| CN | 102998774 A | 3/2013 |
| CN | 103676088 A | 3/2014 |
| CN | 103852858 A | 6/2014 |
| CN | 103969804 A | 8/2014 |
| CN | 104570277 A | 4/2015 |
| CN | 104570295 A | 4/2015 |
| CN | 104914558 A | 9/2015 |
| CN | 104932086 A | 9/2015 |
| CN | 204631345 U | 9/2015 |
| CN | 105259636 A | 1/2016 |
| CN | 105372793 A | 3/2016 |
| CN | 105607232 A | 5/2016 |
| CN | 105607233 A | 5/2016 |
| CN | 205210492 U | 5/2016 |
| CN | 205210493 U | 5/2016 |
| CN | 105988185 A | 10/2016 |
| CN | 105988186 A | 10/2016 |
| CN | 106033141 A | 10/2016 |
| CN | 106154496 A | 11/2016 |
| CN | 106338815 A | 1/2017 |
| CN | 106526796 A | 3/2017 |
| CN | 206074890 U | 4/2017 |
| CN | 106610518 A | 5/2017 |
| CN | 106646825 A | 5/2017 |
| CN | 106772931 A | 5/2017 |
| CN | 106773008 A | 5/2017 |
| CN | 106802469 A | 6/2017 |
| CN | 106842512 A | 6/2017 |
| CN | 106842514 A | 6/2017 |
| CN | 106896474 A | 6/2017 |
| CN | 106959500 A | 7/2017 |
| CN | 106970464 A | 7/2017 |
| CN | 107024756 A | 8/2017 |
| CN | 107102425 A | 8/2017 |
| CN | 107167897 A | 9/2017 |
| CN | 107167902 A | 9/2017 |
| CN | 206460205 U | 9/2017 |
| CN | 107290843 A | 10/2017 |
| CN | 206946078 U | 1/2018 |
| CN | 107703609 A | 2/2018 |
| CN | 107831588 A | 3/2018 |
| CN | 207164341 U | 3/2018 |
| CN | 107976770 A | 5/2018 |
| CN | 108089278 A | 5/2018 |
| CN | 108089317 A | 5/2018 |
| CN | 207424362 U | 5/2018 |
| CN | 207424363 U | 5/2018 |
| CN | 108107548 A | 6/2018 |
| CN | 108227146 A | 6/2018 |
| CN | 207557562 U | 6/2018 |
| CN | 108459394 A | 8/2018 |
| CN | 108761745 A | 11/2018 |
| CN | 108873250 A | 11/2018 |
| CN | 109283665 A | 1/2019 |
| CN | 109375346 A | 2/2019 |
| CN | 208506348 U | 2/2019 |
| CN | 109407267 A | 3/2019 |
| CN | 109725406 A | 5/2019 |
| CN | 109752823 A | 5/2019 |
| CN | 109814234 A | 5/2019 |
| CN | 109814235 A | 5/2019 |
| CN | 208833988 U | 5/2019 |
| CN | 208872939 U | 5/2019 |
| CN | 208888449 U | 5/2019 |
| CN | 109870786 A | 6/2019 |
| CN | 109870788 A | 6/2019 |
| CN | 109917533 A | 6/2019 |
| CN | 110018556 A | 7/2019 |
| CN | 209070186 U | 7/2019 |
| CN | 110109226 A | 8/2019 |
| CN | 110208927 A | 9/2019 |
| CN | 110261997 A | 9/2019 |
| CN | 110398815 A | 11/2019 |
| CN | 110426822 A | 11/2019 |
| CN | 110531500 A | 12/2019 |
| CN | 110568583 A | 12/2019 |
| CN | 110618522 A | 12/2019 |
| CN | 209765129 U | 12/2019 |
| CN | 110646919 A | 1/2020 |
| CN | 110646921 A | 1/2020 |
| CN | 110794555 A | 2/2020 |
| CN | 110879454 A | 3/2020 |
| CN | 111007649 A | 4/2020 |
| CN | 111025600 A | 4/2020 |
| CN | 111308688 A | 6/2020 |
| CN | 111338057 A | 6/2020 |
| CN | 210720853 U | 6/2020 |
| CN | 111399186 A | 7/2020 |
| CN | 211786331 U | 10/2020 |
| JP | 2008268977 A | 11/2008 |
| JP | 2013235242 A | 11/2013 |
| KR | 1020140135909 | 11/2014 |
| TW | 201350956 A | 12/2013 |
| TW | I625567 B | 6/2018 |
| TW | I640811 B | 11/2018 |
| TW | I655474 B | 4/2019 |
| WO | 2003046633 A2 | 6/2003 |
| WO | 2014162779 A1 | 10/2014 |
| WO | 2015159721 A1 | 10/2015 |
| WO | 2017180362 A1 | 10/2017 |
| WO | 2020073978 A1 | 4/2020 |
| WO | 2020220444 A1 | 11/2020 |
| WO | 2021026869 A1 | 2/2021 |
| WO | 2021072745 A1 | 4/2021 |
| WO | 2021087661 A1 | 5/2021 |
| WO | 2021087669 A1 | 5/2021 |
| WO | 2021102943 A1 | 6/2021 |
| WO | 2021103797 A1 | 6/2021 |
| WO | 2021109127 A1 | 6/2021 |
| WO | 2021138754 A1 | 7/2021 |
| WO | 2021179207 A1 | 9/2021 |
| WO | 2021184164 A1 | 9/2021 |
| WO | 2021184165 A1 | 9/2021 |

(56) References Cited

FOREIGN PATENT DOCUMENTS

| WO | 2021184167 A1 | 9/2021 |
|----|---------------|--------|
| WO | 2021203277 A1 | 10/2021 |
| WO | 2021217504 A1 | 11/2021 |
| WO | 2021217664 A1 | 11/2021 |

OTHER PUBLICATIONS

International Search Report dated on Jan. 15, 2020 on International Patent Application PCT/CN2019/110525, filed Jan. 3, 2020, in the name of Jiangxi Jingchao Optical Co. Ltd.
U.S. Appl. No. 17/284,467, filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
U.S. Appl. No. 17/601,075, filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, filled Sep. 19, 2021, in the name of Jiangxi Jingchao Optical Co. Ltd.
U.S. Appl. No. 17/605,985, filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, Oct. 22, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, filed Oct. 18, 2021, in the name of Jiangxi Jingchao Optical Co. Ltd.
International Search Report on International Patent Application PCT/CN2019/122072, filed Nov. 29, 2019, in the name of Jiangxi Jingchao Optical Co. Ltd.
U.S. Appl. No. 17/606,027, filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
U.S. Appl. No. 17/606,040, filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, filed Nov. 13, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, filed Nov. 14, 2021, in the name of Jiangxi Jingchao Optical Co. Ltd.
International Search Report on International Patent Application PCT/CN2020/103797, filed Jul. 23, 2020, in the name of OFilm Group Co. Ltd.
U.S. Appl. No. 17/612,556, filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, filled Nov. 26, 2021, in the name of OFilm Group Co. Ltd. and Jiangxi Jingchao Optical Co. Ltd.
U.S. Appl. No. 17/536,006, filed date Nov. 27, 2021, in the name of Jiangxi Jingchao Optical Co. Ltd.
U.S. Appl. No. 17/536,010, filed Nov. 27, 2021, in the name of Jiangxi Jingchao Optical Co. Ltd.

\* cited by examiner

IMAGING LENS, PHOTOGRAPHING MODULE, AND ELECTRONIC DEVICE

CROSS REFERENCE TO RELATED APPLICATIONS

This application is a national stage application, filed under 35 U.S.C. § 371, of International Patent Application No. PCT/CN2019/093780, filed Jun. 28, 2019, the contents of which is incorporated herein by reference in its entirety.

TECHNICAL FIELD

The present disclosure relates to a field of optical imaging, and in particular to an imaging lens, a camera module, and an electronic device.

BACKGROUND

With the continuous development of camera technology of a mobile phone, there are higher and higher requirements for a camera of the mobile phone. A telephoto lens has advantages of longer focal length, smaller angle of field of view, and larger imaging on a film than a conventional lens, such that the telephoto lens can capture larger images than the standard lens at the same capturing distance, which is applicable for capturing distant scenes. In addition, since a depth of field of the telephoto lens is smaller than that of the conventional lens, it can more effectively blur the background and highlight the object in focus, such that the captured picture is more vivid. However, if it is intended to obtain a lens having a longer focal length, it is difficult to ensure that the lens has enough amount of light, resulting in darker captured pictures and lower capturing quality.

SUMMARY

According to various embodiments of the present disclosure, an imaging lens, a camera module, and an electronic device are provided.

An imaging lens includes, successively in order from an object side to an image side:

a first lens having a refractive power, an object side surface of the first lens being convex at an optical axis;

a second lens having a refractive power, an object side surface of the second lens being convex at the optical axis; and a third lens having a refractive power, wherein the imaging lens satisfies the following condition:

$$FNO*L>15.5;$$

wherein FNO is an f-number of the imaging lens, L is an aperture diameter of the first lens, and a unit of L is mm.

Details of one or more embodiments of the present disclosure will be given in the following description and attached drawings. Other features, objects and advantages of the present disclosure will become apparent from the description, drawings, and claims.

BRIEF DESCRIPTION OF THE DRAWINGS

In order to better describe and illustrate the embodiments and/or examples of the contents disclosed herein, reference may be made to one or more drawings. Additional details or examples used to describe the drawings should not be considered as limiting the scope of any of the disclosed contents, the currently described embodiments and/or examples, and the best mode of these contents currently understood.

DETAILED DESCRIPTION OF THE EMBODIMENTS

Figure 1:
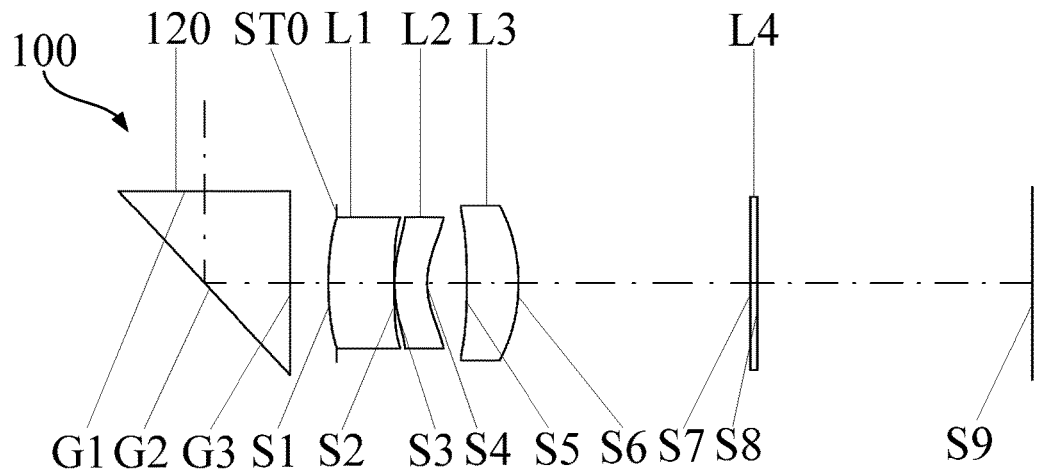
FIG. 1 is a schematic view of an imaging lens according to a first embodiment of the present disclosure.

In order to facilitate the understanding of the present disclosure, the present disclosure will be described more fully below with reference to the relevant drawings. Preferred embodiments of the present disclosure are shown in the drawings. However, the present disclosure can be implemented in many different forms and is not limited to the embodiments described herein. On the contrary, the purpose of providing these embodiments is to make the disclosure of the present disclosure more thorough and comprehensive.

It should be noted that when an element is referred to as being "fixed to" another element, it can be directly on another element or an intervening element may also be present therebetween. When an element is considered to be "connected to" another element, it can be directly connected to another element or an intervening element may be present at the same time. Terms "inner", "outer", "left", "right" and similar expressions used herein are for illustrative purposes only, and do not mean that they are the only embodiments.

Referring to FIG. 1, an imaging lens 100 is provided according to the present disclosure. The imaging lens 10 includes, successively in order from an object side to an image side, a first third lens L1 having a refractive power, a second lens L2 having a refractive power, and a third lens L3 having a refractive power.

The first lens L1 includes an object side surface S1 and an image side surface S2. The second lens L2 includes an object side surface S3 and an image side surface S4. The third lens L3 includes an object side surface S5 and an image side surface S6. In addition, an imaging surface S9 is provided on an image side of the third lens L3. The imaging surface S9 may be a photosensitive surface of a photosensitive element. The object side surface S1 of the first lens L1 is convex on an optical axis. The object side surface S3 of the second lens L2 is convex on the optical axis.

In addition, it should be noted that a system or an optical system as described below may be composed of elements such as a reflector, an imaging lens 100, and a filter.

In some embodiments, the first lens L1, the second lens L2, and the third lens L3 are all made of plastic, such that the manufacture cost and the weight can be reduced. In other embodiments, the first lens L1, the second lens L2, and the third lens L3 are all made of glass, and the lenses made of glass have better optical performance. Preferably, the first lens L1 may be a glass lens. The lens made of glass has higher heat resistance, so as to prevent the lens from being prone to aging in a high temperature environment and reducing the optical performance. It should be noted that, according to actual manufacture requirements, the first lens L1, the second lens L2, and the third lens L3 can also be made of the above materials in arbitrary combination, which is not limited herein.

In some embodiments, a stop STO is provided on an object side of the first lens L1. In other embodiments, the stop STO may also be arranged between the first lens L1 and the third lens L3. The stop STO can limit the amount of light passing through the imaging lens 100.

When describing that the stop STO is provided on the object side of the first lens L1, or describing that the imaging lens 100 is provided with the stop STO, the first lens L1, the second lens L2 and the like, successively in order from the object side to the image side, a projection of the stop STO on the optical axis of the first lens L1 may or may not overlap with a projection of the first lens L1 on the optical axis.

In some embodiments, an infrared cut-off filter L4 is provided on the image side of the third lens L3. The infrared cut-off filter L4 includes an object side surface S7 and an image side surface S8. The infrared cut-off filter L4 can allow light at visible light wavebands to be transmitted through and isolate infrared light, thus preventing the infrared light from reaching the photosensitive element to affect the imaging of the visible light, thereby improving the imaging effect of the imaging lens 100 in the daytime. It should be noted that the infrared cut-off filter L4 may not be provided in the imaging lens 100. Instead, the infrared cut-off filter is assembled between the imaging lens 100 and the photosensitive element when the imaging lens 100 is assembled with the photosensitive element.

Referring to FIG. 1, in some embodiments, the imaging lens 100 further includes a reflector 120, which is arranged on the object side of the first lens L1. The light carrying information of a subject can be reflected by the reflector 120 into the lens group (composed of the first lens L1, the second lens L2, and the third lens L3) of the imaging lens 100. Specifically, the reflector 120 may be a prism, which is arranged on the object side of the first lens L1. The prism can change the propagation direction of light by 90° to reflect the light to the first lens L1, the second lens L2, and the third lens L3. By providing the reflector 120, the imaging lens 100 can be more easily applied to a device with a small size (especially with a small thickness). In other embodiments, the reflector 120 may also be a plane mirror.

Specifically, in some of the embodiments, the prism includes an incident surface G1, a reflecting surface G2, and an outgoing surface G3. The outgoing surface G3 is perpendicular to the optical axis of the first lens L1. The reflecting surface G2 and the outgoing surface G3 form an angle of 45 degrees. The incident surface G1 is perpendicular to the outgoing surface G3 and forms an angle of 45 degrees with the reflecting surface G2. The light carrying the information of the subject enters the prism through the incident surface G1, and then the light is reflected by the reflecting surface G2 and then emitted from the outgoing surface G3 to the first lens L1.

In some embodiments, the object side surfaces and the image side surfaces of the first lens L1, the second lens L2, and the third lens L3 are all aspherical. The aspheric surface shape formula is:

$$Z = \frac{cr^2}{1+\sqrt{1-(k+1)c^2 r^2}} + \sum_i A_i r^i$$

where Z is a distance from a corresponding point on an aspheric surface to a plane tangent to a vertex of the surface, r is a distance from a corresponding point on the aspheric surface to the optical axis, c is a curvature of the vertex of the aspheric surface, k is a conic constant, and Ai is a coefficient corresponding to the $i^{th}$ high-order term in the surface shape formula.

In some embodiments, the optical system 100 satisfies the following condition:

FNO*$L$>15.5;

where FNO is an f-number of the imaging lens 100, L is an aperture diameter of the first lens L1, and the unit of L is mm. Specifically, the FNO*L may be equal to 17.50, 17.55, 17.60, 17.65, 17.70, 17.73, or 17.74. When the above condition is satisfied, the optical system has a larger focal length range to meet the telephoto characteristics, and the focal length thereof is longer than the focal length of the conventional telephoto system. Meanwhile, the optical system also has the amount of light that matches the focal length range, so as to increase brightness of the picture during telephoto capturing. As such, it is beneficial to improve the capturing quality when the optical system is applied to the telephoto capturing. When FNO*L<15.5, although the optical system has enough amount of light to ensure the contrast of the captured image, it is difficult to ensure that the optical system has the telephoto characteristic.

In some embodiments, the optical system 100 satisfies a condition:

1<(Σ$ET$*EPD)/$f$<3;

where ΣET is a distance from the stop STO to a portion of the image side surface S6 of the third lens L3 at the maximum effective radius in the direction parallel to the optical axis, EPD is an entrance pupil diameter of the imaging lens 100, and f is an effective focal length of the imaging lens 100. Specifically, the ratio (ΣET*EPD)/f may be equal to 1.15, 1.35, 1.55, 1.75, 1.95, 2.15, 2.35, or 2.40. ΣET determines the total length of the edge of the optical system, and EPD is the entrance pupil diameter of the optical system. That is, ΣET*EPD determines the size of the entire optical system. Therefore, when the above condition is satisfied, the miniaturization design and telephoto performance of the imaging lens 100 can be met at the same time. If (ΣET*EPD)/f>3, the volume of the system is too large to meet the miniaturization design requirements. When (ΣET*EPD)/f<1, the volume of the system is too small, the phase difference correction is difficult, and the optical performance parameters does not meet the design requirements.

In some embodiments, the optical system 100 satisfies a condition:

$$-37<f1/CT1<22;$$

where f1 is a focal length of the first lens L1, and CT1 is a thickness of the first lens L1 at the optical axis. Specifically, the ratio f1/CT1 may be equal to −35.00, −25.00, −15.00, −5.00, 5.00, 10.00 or 15.00. A ratio between the focal length and the thickness of the first lens L1 determines how the second lens L2 and the third lens L3 are combined to balance the aberration generated by the first lens L1. When f1/CT1>22, it is difficult to correct the aberration of the system. When f1/CT1<−37, the light angle emitted from the image side surface S2 of the first lens L1 becomes larger, resulting in a smaller value of the focal length of the first lens L1, which cannot provide sufficient focal length for the system.

In some embodiments, the optical system 100 satisfies a condition:

$$1.0<TTL/|f|<1.2;$$

where TTL is a distance from the object side surface S1 of the first lens L1 to the imaging surface S9 of the imaging lens 100 on the optical axis, and f is an effective focal length of the imaging lens 100. Specifically, the ratio TTL/|f| may be equal to 1.03, 1.05, 1.07, 1.09, 1.11, 1.13, 1.15, or 1.17. The three lenses in the imaging lens 100 cooperate with each other. When the above condition is satisfied, the length of the imaging lens 100 can be adjusted reasonably to avoid the length of the lens from being too long, so as to meet the requirements of reasonable focal length and miniaturization design. When TTL/|f|<1.0, the optical length of the lens group is too short, which increases the sensitivity of the system and makes it difficult to correct aberrations. When TTL/|f|>1.2, the optical length of the lens group is too long, causing the main light angle of the light incident on the imaging surface S9 to be too large, which shortens the effective focal length of the imaging lens 100, and is unable to meet a reasonable focal length, thereby being unable to realize the telephoto design.

In some embodiments, the optical system 100 satisfies a condition:

$$0.7<TTL/|f1|<2.7;$$

where TTL is a distance from the object side surface S1 of the first lens L1 to the imaging surface S9 of the imaging lens 100 on the optical axis, and f1 is a focal length of the first lens L1. Specifically, the ratio TTL/|f1| may be equal to 0.90, 0.95, 1.00, 1.20, 1.50, 2.00, or 2.50. When the above condition is satisfied, it is beneficial to correct the aberration of the optical system. When TTL/|f1|<0.7, the optical length of the imaging lens 100 is too short, which increases the sensitivity of the system and makes it difficult to correct aberrations. When TTL/|f1|>2.7, the ratio of the optical length of the imaging lens 100 to the focal length of the first lens L1 is too large, the combination of the second lens L2 and the third lens is difficult to balance the aberrations generated by the first lens L1, resulting in poor imaging quality, which cannot meet the capturing requirements.

In some embodiments, the optical system 100 satisfies a condition:

$$-585<(f2+f3)/CT2<30;$$

where f2 is a focal length of the second lens L2, f3 is a focal length of the third lens L3, and CT2 is a thickness of the second lens L2 at the optical axis. Specifically, the ratio (f2+f3)/CT2 may be equal to −570.00, −5.00, −1.00, 1.00, 20.00, 25.00 or 28.00. When the above condition is satisfied, the refractive powers of the second lens L2 and the third lens L3 can be reasonably distributed to balance the aberration generated by the first lens L1, so as to reduce the tolerance sensitivity of the system, and improve the imaging quality of the system. When (f2+f3)/CT2≤−585, the center thickness of the second lens L2 is too large, resulting in that the overall length of the optical system is too long. When (f2+f3)/CT2≥30, the center thickness of the second lens L2 is too small, resulting in manufacturing difficulties.

In some embodiments, the optical system 100 satisfies a condition:

$$-0.8<f23/f<10;$$

where f23 is a combined focal length of the second lens L2 and the third lens L3, and f is an effective focal length of the imaging lens 100. Specifically, the ratio f23/f may be equal to −0.70, −0.65, 0.30, 0.55, 3.00, 3.60, 9.00 or 9.30. When the above condition is satisfied, the refractive powers of the second lens L2 and the third lens L3 can be reasonably distributed to effectively correct the aberration of the system. When f23/f≥10, the refractive power provided by the second lens L2 and the third lens L3 is insufficient, and it is difficult to correct the aberrations of the system. When f23/f≤−0.8, and the second lens L2 and the third lens L3 are plastic lenses, the focal position of the imaging lens 100 changes greatly as temperature changes, resulting in the increased tolerance sensitivity of the imaging lens 100.

In some embodiments, the optical system 100 satisfies a condition:

$$-5<R2/f1<5;$$

where R2 is a radius of curvature of the image side surface S2 of the first lens L1 at the optical axis, and f1 is the focal length of the first lens L1. Specifically, the ratio R2/f1 may be equal to −4.00, −3.50, 0.20, 0.30, 0.80, 0.90, 4.00 or 4.50. When the above condition is satisfied, the image side surface S2 of the first lens L1 has an appropriate radius of curvature at the optical axis, which is beneficial to correct aberrations. When R2/f1<−5, the radius of curvature of the image side surface S2 of the first lens L1 at the optical axis is too large, the surface curvature becomes larger, the forming yield is low, and it is difficult to manufacture the lens. When R2/f1>5, the radius of curvature of the image side surface S2 of the first lens L1 at the optical axis does not match the focal length of the first lens L1, resulting in excessive aberration of the optical system and difficult correction.

In some embodiments, the optical system 100 satisfies a condition:

$$11<BFL<16;$$

where BFL is the shortest distance from the image side surface S6 of the third lens L3 to the imaging surface S9 of the imaging lens 100 in the direction parallel to the optical axis, and the unit of BFL is mm. Specifically, the BFL may be 12.80, 13.40, 14.00, 14.60, 14.80, 15.30, or 15.50. When the above condition is satisfied, it can ensure that the system has a sufficient focusing range during assembly, and improve the assembly yield of the lens module. In addition, the imaging lens 100 can have a larger focal depth, which is beneficial to obtain more depth information of the subject.

In some embodiments, the optical system 100 satisfies a condition:

$$91<TTL/SL<3450;$$

where TTL is a distance from the object side surface S1 of the first lens L1 to the imaging surface S9 of the imaging lens 100 on the optical axis, and SL is a distance from the stop STO to a portion of the object side S1 of the first lens L1 at the maximum effective radius in the direction parallel to the optical axis. Specifically, the ratio TTL/SL may be equal to 95.00, 100.00, 3100.00, 3200.00, 3300.00, or 3400.00. When TTL/SL>3450, the system is too long to meet the requirements of minimized design. When TTL/SL<91, the system cannot correct the edge spherical aberration. When the total optical length of the system is fixed, the stop STO serves to shield the light at an edge of the lens, thereby correcting spherical aberration. If the arrangements of the stop STO and the total optical length are unreasonable, the expected imaging quality requirements cannot be achieved.

In some embodiments, the optical system 100 satisfies a condition:

$$0.13<\Sigma ET(len)/TTL<0.25;$$

where $\Sigma ET(len)$ is the sum of thicknesses of the first lens L1, the second lens L2, and the third lens L3 at the respective maximum effective radius thereof, and TTL is a distance from the object side surface S1 of the first lens L1 to the imaging surface S9 of the imaging lens 100 on the optical axis. Specifically, the ratio $\Sigma ET(len)/TTL$ may be equal to 0.16, 0.18, 0.19, 0.20, 0.22, or 0.23. When $\Sigma ET(len)/TTL<0.13$, the edge thickness may be too thin, the manufacture is difficult to process, and the assembly stability is poor. When $\Sigma ET(len)/TTL>0.25$, the optical system is too long, which does not satisfy the original intention of minimized design.

In some embodiments, the optical system 100 satisfies a condition:

$$0.06<ET12/f<0.2;$$

where ET12 is the sum of thicknesses of the first lens L1 and the second lens L2 at the respective maximum effective radius thereof, and f is an effective focal length of the imaging lens 100. Specifically, the ratio ET12/f may be equal to 0.08, 0.10, 0.12, 0.14, 0.15, 0.16, or 0.17. If ET12/f≥0.2, while meeting the processing requirements, the imaging lens 100 cannot meet the telephoto characteristics. When ET12/f<0.06, the sensitivity of the system is poor, which is disadvantageous for processing.

In some embodiments, the imaging lens 100 and the photosensitive element are assembled together to form a camera module. The photosensitive element is arranged on the imaging surface S9 of the imaging lens 100, and the camera module satisfies a condition:

$$4<TTL/Imgh<8;$$

where TTL is a distance from the object side surface S1 of the first lens L1 to the imaging surface S9 of the imaging lens 100 on the optical axis, and Imgh is half of a diagonal length of an effective pixel area of the photosensitive element. Specifically, the ratio TTL/Imgh may be equal to 6.80, 6.90, 7.00, 7.20, 7.40, 7.60, or 7.70. When TTL/Imgh<4, the photosensitive element cannot receive complete light information, and the light at the edge reaches an edge of the photosensitive element to produce stray light. When TTL/Imgh>8, the total length of the system does not match the image height, resulting in an incomplete imaging or a too long system.

First Embodiment

Figure 2:
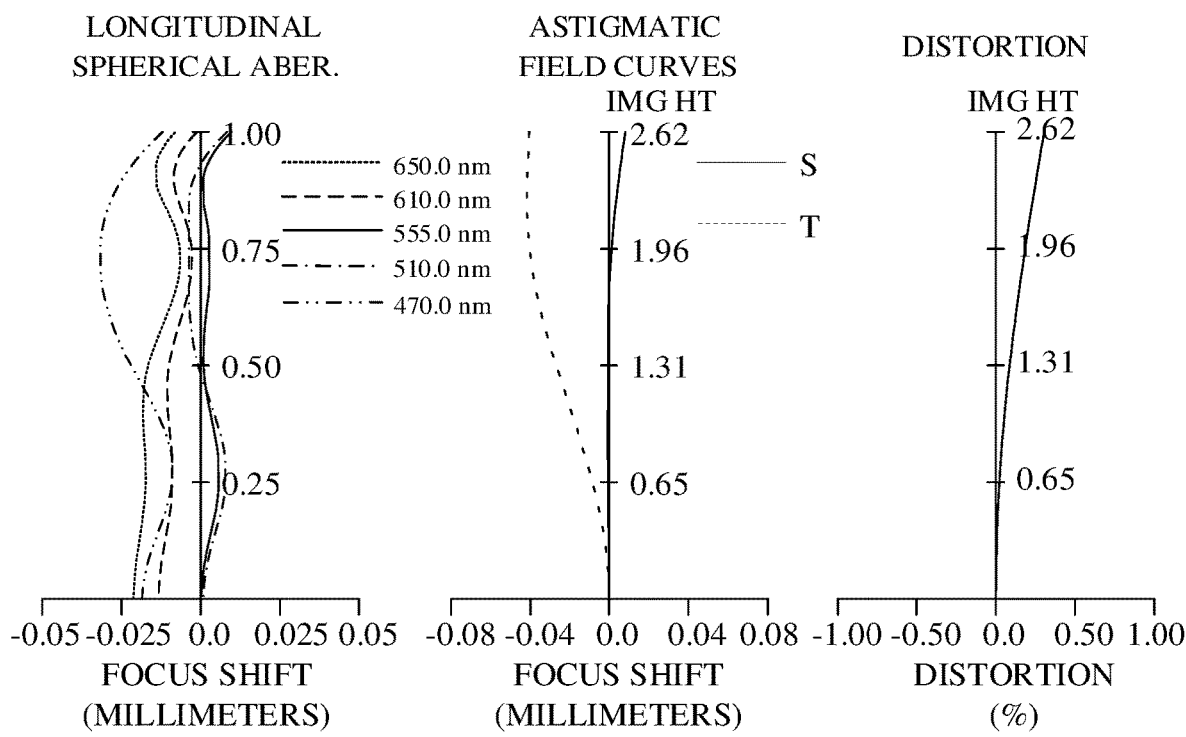
FIG. 2 is a graph showing longitudinal spherical aberration (mm), astigmatism (mm), and distortion (%) of the imaging lens according to the first embodiment.

Referring to the first embodiment shown in FIG. 1, the imaging lens 100 includes, successively in order from the object side to the image side, a stop STO, a first lens L1 having a positive refractive power, a second lens L2 having a negative refractive power, a third lens L3 having a positive refractive power, and an infrared cut-off filter L4. FIG. 2 is a graph showing longitudinal spherical aberration (mm), astigmatism (mm), and distortion (%) of the imaging lens 100 according to the first embodiment, where the astigmatism diagram and the distortion diagram are data diagrams at a reference wavelength.

An object side surface S1 of the first lens L1 is convex at an optical axis, an image side surface S2 of the first lens L1 is concave at the optical axis. The object side S1 of the first lens L1 is convex at its circumference, and the image side surface S2 of the first lens L1 is concave at its circumference. An object side surface S3 of the second lens L2 is convex at the optical axis, an image side surface S4 of the second lens L2 is concave at the optical axis. The object side surface S3 of the second lens L2 is convex at its circumference, and the image side surface S4 of the second lens L2 is concave at its circumference. An object side surface S5 of the third lens L3 is concave at the optical axis, an image side surface S6 of the third lens L3 is convex at the optical axis. The object side surface S5 of the third lens L3 is concave at its circumference, and the image side surface S6 of the third lens L3 is convex at its circumference.

It should be noted that when describing that a side surface of the lens at the optical axis (a central area of the side surface) is convex, it can be understood that an area of this side surface of the lens close to the optical axis is convex. Therefore, it can also be determined that the side surface is convex at its paraxial area. When describing a side surface of the lens is concave at its circumference, it can be understood that an area of the side surface is concave when approaching the maximum effective radius. For example, when the side surface is convex at the optical axis and is also convex at its circumference, a shape of the side surface in a direction from its center (the optical axis) to its edge may be completely convex, or may be first convex at its center and be then transitioned to be concave, and then become convex when approaching the maximum effective radius. These are only an example to illustrate various shapes and structures (concave-convex relationship) of the side surface at the optical axis and the circumference, and the various shapes and structures (concave-convex relationship) of the side surface are not fully embodied, but other situations can be derived from the above examples.

The first lens L1, the second lens L2 and the third lens L3 are all made of plastic.

The object side surfaces and the image side surfaces of the first lens L1, the second lens L2, and the third lens L3 are all aspherical.

Continuing to refer to FIG. 1, in some embodiments, the imaging lens 100 further includes a prism. The prism is arranged on the object side of the first lens L1 to reflect the light carrying information of a subject to a lens group composed of the first lens L1, the second lens L2, and the third lens L3.

In addition, the imaging lens 100 also satisfies the following conditions:

FNO*L=17.44; where FNO is an f-number of the imaging lens 100, L is an aperture diameter of the first lens L1, and the unit of L is mm. When the above condition is satisfied, the optical system has a larger focal length range, which is longer than the focal length of the conventional telephoto system, to meet the telephoto characteristics. As such, the optical system also has the amount of light that matches the focal length range to increase brightness of the picture during telephoto capturing. Thus, it is beneficial to improve the capturing quality when the optical system is applied to the telephoto capturing.

(ΣET*EPD)/f=2.45; where ΣET is a distance from the stop STO to a portion of the image side surface S6 of the third lens L3 at the maximum effective radius in the direction parallel to the optical axis, EPD is an entrance pupil diameter of the imaging lens 100, and f is an effective focal length of the imaging lens 100. ΣET determines the total length of the edge of the optical system, and EPD is the entrance pupil diameter of the optical system. That is, ΣET*EPD determines the size of the entire optical system. Therefore, when the above condition is satisfied, the miniaturization design and telephoto performance of the imaging lens 100 can be met at the same time.

f1/CT1=8.64; where f1 is a focal length of the first lens L1, and CT1 is a thickness of the first lens L1 at the optical axis.

TTL/|f|=1.18; where TTL is a distance from the object side surface S1 of the first lens L1 to the imaging surface S9 of the imaging lens 100 on the optical axis, and f is an effective focal length of the imaging lens 100. The three lenses in the imaging lens 100 cooperate with each other, and when the above condition is satisfied, the length of the imaging lens 100 can be adjusted reasonably to avoid the length of the lens from being too long, so as to meet the requirements of reasonable focal length and miniaturization design.

TTL/|f1|=1.24; where TTL is a distance from the object side surface S1 of the first lens L1 to the imaging surface S9 of the imaging lens 100 on the optical axis, and f1 is a focal length of the first lens L1. When the above condition is satisfied, it is beneficial to correct the aberration of the optical system.

(f2+f3)/CT2=0.79; where f2 is a focal length of the second lens L2, f3 is a focal length of the third lens L3, and CT2 is a thickness of the second lens L2 at the optical axis. When the above condition is satisfied, the second lens L2 and the third lens L3 can reasonably arrange the refractive power to balance the aberration generated by the first lens L1, reduce the tolerance sensitivity of the system, and improve the imaging quality of the system.

f23/f=9.46; where f23 is a combined focal length of the second lens L2 and the third lens L3, and f is an effective focal length of the imaging lens 100. When the above condition is satisfied, the refractive powers of the second lens L2 and the third lens L3 can be reasonably distributed to effectively correct the aberration of the system.

R2/f1=4.14; where R2 is a radius of curvature of the image side surface S2 of the first lens L1 at the optical axis, and f1 is the focal length of the first lens L1. When the above condition is satisfied, the image side surface of the first lens L1 has an appropriate radius of curvature at the optical axis, which is beneficial to correct aberrations.

BFL=14.95; where BFL is the shortest distance from the image side surface S6 of the third lens L3 to the imaging surface S9 of the imaging lens 100 in the direction parallel to the optical axis, and the unit of BFL is mm. When the above condition is satisfied, it can ensure that the system has a sufficient focusing range during assembly, and improve the assembly yield of the lens module. In addition, the imaging lens 100 can have a larger focal depth, which is beneficial to obtain more depth information of the subject.

TTL/SL=3413.83; where TTL is a distance from the object side surface S1 of the first lens L1 to the imaging surface S9 of the imaging lens 100 on the optical axis, and SL is a distance from the stop STO to a portion of the object side S1 of the first lens L1 at the maximum effective radius in the direction parallel to the optical axis.

ΣET(len)/TTL=0.20; where ΣET(len) is the sum of thicknesses of the first lens L1, the second lens L2, and the third lens L3 at the respective maximum effective radius thereof, and TTL is a distance from the object side surface S1 of the first lens L1 to the imaging surface S9 of the imaging lens 100 on the optical axis.

ET12/f=0.17; where ET12 is the sum of thicknesses of the first lens L1 and the second lens L2 at the respective maximum effective radius thereof, and f is an effective focal length of the imaging lens 100.

When the photosensitive element is arranged on the imaging surface S9 of the imaging lens 100, a condition is further satisfied: TTL/Imgh=7.82; where TTL is a distance from the object side surface S1 of the first lens L1 to the imaging surface S9 of the imaging lens 100 on the optical axis, and Imgh is half of a diagonal length of an effective pixel area of the photosensitive element.

In addition, various parameters of the imaging lens 100 are shown in Table 1 and Table 2. The elements from the object surface to the image side are arranged in the order of the elements in Table 1 from top to bottom. The surface numbers 6 and 7 indicate the object side surface S1 and the image side surface S2 of the first lens L1, respectively. That is, in the same lens, the surface with the smaller surface number is the object side surface, and the surface with the larger surface number is the image side surface. The Y radius in Table 1 is the radius of curvature of the object side surface or image side surface indicated by corresponding surface number at the optical axis. In the "thickness" parameter column of the first lens L1, the first value (absolute value) is the thickness of the lens on the optical axis, and the second value is the distance from the image side surface of the lens to the object side surface of the latter lens on the optical axis. The value of the stop STO in the "thickness" parameter column is the distance from the stop STO to the vertex of the object side surface of the latter lens (the vertex refers to the intersection of the lens and the optical axis) on the optical axis. Here, the default is that the direction from the object side surface S1 of the first lens L1 to the image side surface S6 of the third lens L3 is the negative direction of the optical axis. When the value of the "thickness" is positive, it means that the stop STO is arranged on the right side of the vertex of the object side surface of the lens (refer to FIG. 1). If the value of the "thickness" of the stop STO is negative, the stop STO is on the left side of the vertex of the object side surface of the lens. In addition, the surface numbers 2 to 4 indicate the incident surface G1, the reflecting surface G2, and the outgoing surface G3 of the prism, respectively (refer to FIG. 1). The absolute value of the corresponding "thickness" parameter is the distance from the surface to the next surface on the optical path. The value of the thickness in the surface number 4 is the distance from the outgoing surface G3 to the stop STO on the optical path. In addition, the surface whose surface number is 1 in the table is a virtual surface that simulates the light-emitting surface in the design program.

Table 2 is a table of relevant parameters of the aspheric surface of each lens in Table 1, where K is the conic constant and Ai is the coefficient corresponding to the $i^{th}$ higher order term in the aspheric surface shape formula.

In addition, in the following embodiments, the refractive index and focal length of each lens are values at the reference wavelength. In each of the embodiments, preferentially, the calculation result of the condition is based on the data in the optical element parameter table of the corresponding embodiment (such as Table 1 of the first embodiment) and the aspheric coefficient table (such as FIG. 2 of the first embodiment).

In the first embodiment, the effective focal length of the imaging lens 100 is indicated by f, and f=17.41 mm. The f-number is indicated by FNO, and FNO=4.9. The angle of field of view is indicated by FOV, and FOV=17.06 degrees (deg.). The distance from the object side surface S1 of the first lens L1 to the imaging surface S9 on the optical axis is indicated by TTL, and TTL=20.48 mm.

(mm), astigmatism (mm), and distortion (%) of the imaging lens 100 according to the second embodiment, where the astigmatism diagram and the distortion diagram are data diagrams at a reference wavelength.

An object side surface S1 of the first lens L1 is convex at an optical axis, an image side surface S2 of the first lens L1 is concave at the optical axis. The object side S1 of the first lens L1 is convex at its circumference, and the image side surface S2 of the first lens L1 is concave at its circumference. An object side surface S3 of the second lens L2 is

TABLE 1

First Embodiment
f = 17.41 mm, FNO = 4.9, FOV = 17.06 degrees, TTL = 20.48 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Virtual Surface | Spherical | Infinite | 8.35 | | | | |
| 2 | Prism Surface | Spherical | Infinite | 2.50 | Glass | 1.52 | 64.17 | Infinite |
| 3 | Prism Surface | Spherical | Infinite | −2.50 | | | | |
| 4 | Prism Surface | Spherical | Infinite | −1.35 | | | | |
| 5 | Stop | Spherical | Infinite | 0.24 | | | | |
| 6 | First Lens | Aspherical | −8.07 | −1.92 | Plastic | 1.55 | 56.11 | 16.56 |
| 7 | | Aspherical | −68.55 | −0.01 | | | | |
| 8 | Second Lens | Aspherical | −3.65 | −0.94 | Plastic | 1.64 | 23.52 | −10.57 |
| 9 | | Aspherical | −2.14 | −1.16 | | | | |
| 10 | Third Lens | Aspherical | 13.01 | −1.50 | Plastic | 1.55 | 56.11 | 11.31 |
| 11 | | Aspherical | 4.36 | −6.74 | | | | |
| 12 | Infrared Cut-off Filter | Spherical | Infinite | −0.21 | Glass | | | |
| 13 | | Spherical | Infinite | −8.00 | | | | |
| 14 | Imaging Surface | Spherical | Infinite | 0.00 | | | | |

Note:
the reference wavelength is 555 nm

TABLE 2

First Embodiment
Aspheric Coefficient

| Surface Number | 6 | 7 | 8 | 9 | 10 | 11 |
|---|---|---|---|---|---|---|
| K   | 0.00E+00 | 0.00E+00 | 0.00E+00 | 0.00E+00 | 0.00E+00 | 0.00E+00 |
| A4  | −3.62E−03 | −1.90E−02 | 3.17E−03 | 2.55E−02 | −6.80E−03 | −1.20E−03 |
| A6  | −6.64E−04 | 4.38E−03 | 8.45E−03 | 1.24E−02 | 3.34E−03 | 7.15E−04 |
| A8  | 1.02E−04 | −2.26E−03 | −2.69E−03 | −2.95E−03 | 1.65E−04 | 1.17E−06 |
| A10 | −5.85E−06 | 4.22E−04 | 4.19E−04 | 3.87E−04 | −1.24E−04 | −1.90E−05 |
| A12 | 0.00E+00 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

Second Embodiment

Figure 3:
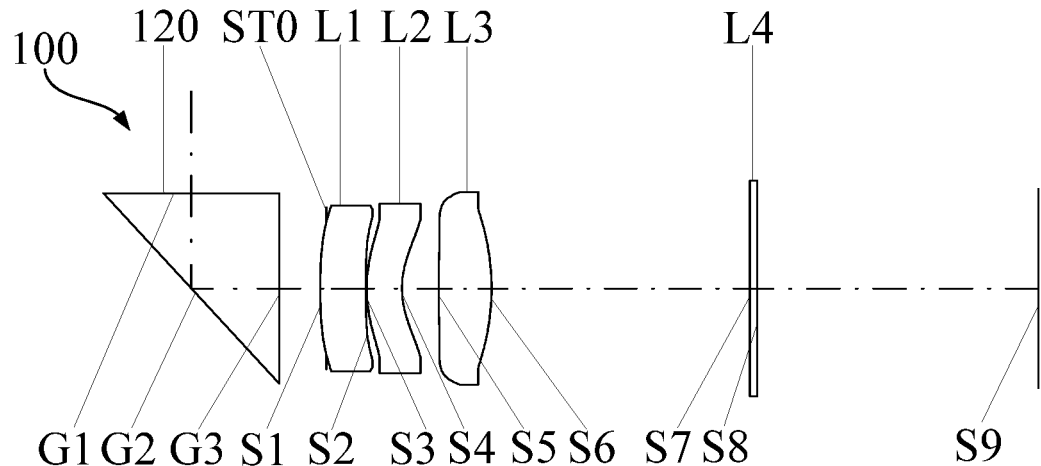
FIG. 3 is a schematic view of an imaging lens according to a second embodiment of the present disclosure.
Figure 4:
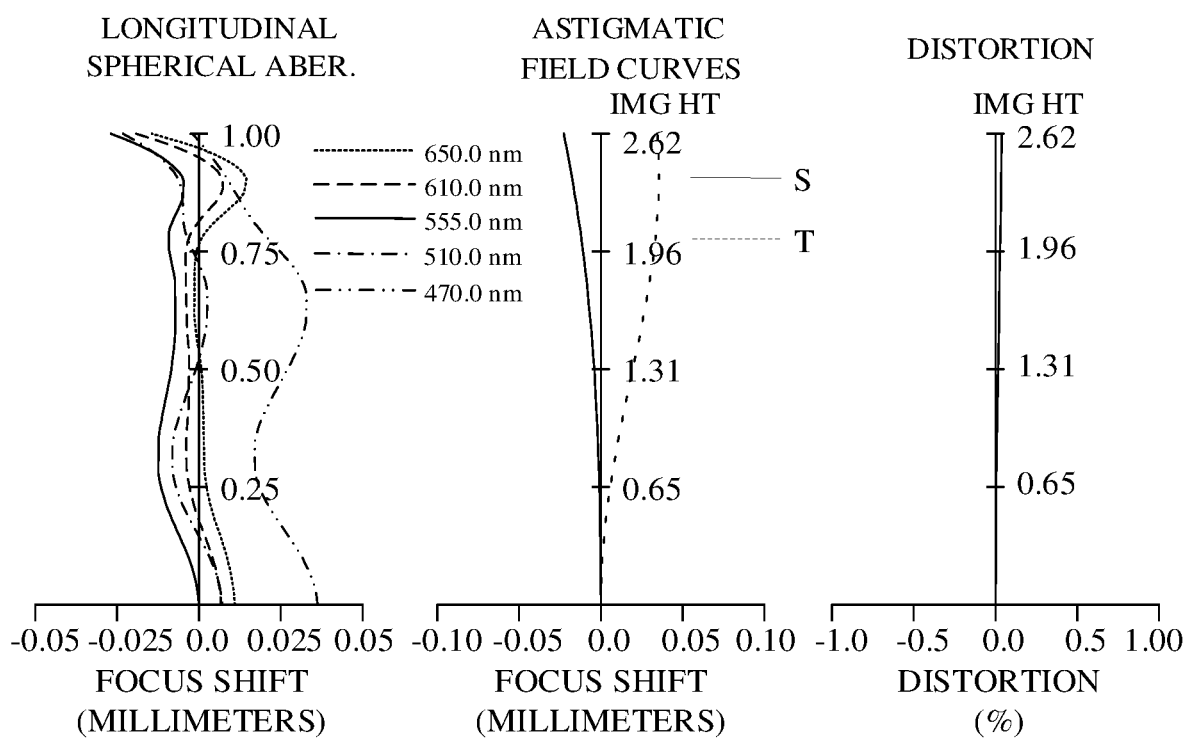
FIG. 4 is a graph showing longitudinal spherical aberration (mm), astigmatism (mm), and distortion (%) of the imaging lens according to the second embodiment.

Referring to the second embodiment shown in FIG. 3, the imaging lens 100 includes, successively in order from the object side to the image side, a stop STO, a first lens L1 having a positive refractive power, a second lens L2 having a negative refractive power, a third lens L3 having a positive refractive power, and an infrared cut-off filter L4. In some embodiments, the imaging lens 100 further includes a prism arranged on an object side of the first lens L1. In addition, FIG. 4 is a graph showing longitudinal spherical aberration convex at the optical axis, an image side surface S4 of the second lens L2 is concave at the optical axis. The object side surface S3 of the second lens L2 is convex at its circumference, and the image side surface S4 of the second lens L2 is concave at its circumference. An object side surface S5 of the third lens L3 is convex at the optical axis, an image side surface S6 of the third lens L3 is convex at the optical axis. The object side surface S5 of the third lens L3 is convex at its circumference, and the image side surface S6 of the third lens L3 is convex at its circumference.

The object side surfaces and the image side surfaces of the first lens L1, the second lens L2, and the third lens L3 are all aspherical.

In addition, the first lens L1, the second lens L2 and the third lens L3 are all made of plastic.

In the second embodiment, the effective focal length of the imaging lens 100 is indicated by f, and f=17.40 mm. The f-number is indicated by FNO, and FNO=4.9. The angle of field of view is indicated by FOV, and FOV=17.12 degrees (deg.). The distance from the object side surface S1 of the first lens L1 to the imaging surface S9 on the optical axis is indicated by TTL, and TTL=20.43 mm.

In addition, various parameters of the optical system 100 are shown in Table 3 and Table 4. Definitions of the various parameters can be obtained from the first embodiment, and which will not be repeated herein.

| Second Embodiment | | | |
|---|---|---|---|
| f (mm) | 17.40 | TTL/|f1| | 0.96 |
| FNO | 4.9 | (f2 + f3)/CT2 | −1.04 |
| FOV (degree) | 17.12 | f23/f | 3.48 |
| TTL (mm) | 20.43 | R2/f1 | 4.67 |
| FNO*L | 17.44 | BFL (mm) | 15.56 |
| (ΣET*EPD)/f | 2.46 | TTL/SL | 3405.50 |
| f1/CT1 | 16.34 | ΣET(len)/TTL | 0.17 |
| TTL/|f| | 1.17 | ET12/f | 0.14 |
| | | TTL/Imgh | 7.80 |

Third Embodiment

Figure 5:
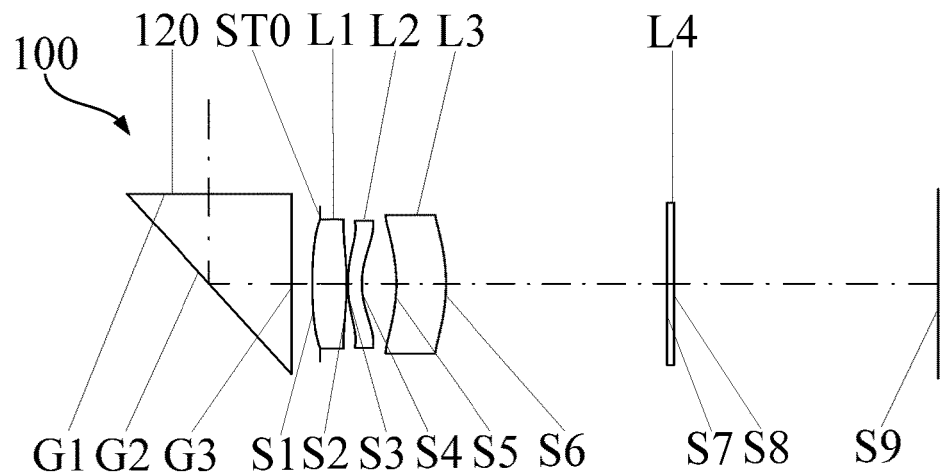
FIG. 5 is a schematic view of an imaging lens according to a third embodiment of the present disclosure.

Referring to the third embodiment shown in FIG. 5, the imaging lens 100 includes, successively in order from the object side to the image side, a stop STO, a first lens L1 having a positive refractive power, a second lens L2 having

TABLE 3

Second Embodiment
f = 17.40 mm, FNO = 4.9, FOV = 17.12 degrees, TTL = 20.43 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Virtual Surface | Spherical | Infinite | 5.00 | | | | |
| 2 | Prism Surface | Spherical | Infinite | 2.50 | Glass | 1.52 | 64.17 | Infinite |
| 3 | Prism Surface | Spherical | Infinite | −2.50 | | | | |
| 4 | Prism Surface | Spherical | Infinite | −1.35 | | | | |
| 5 | Stop | Spherical | Infinite | 0.18 | | | | |
| 6 | First Lens | Aspherical | −13.17 | −1.31 | Plastic | 1.55 | 56.11 | 21.40 |
| 7 | | Aspherical | 100.00 | −0.02 | | | | |
| 8 | Second Lens | Aspherical | −3.56 | −1.00 | Plastic | 1.64 | 23.52 | −10.98 |
| 9 | | Aspherical | −2.11 | −1.05 | | | | |
| 10 | Third Lens | Aspherical | −100.00 | −1.50 | Plastic | 1.55 | 56.11 | 9.94 |
| 11 | | Aspherical | 5.71 | −7.35 | | | | |
| 12 | Infrared Cut-off Filter | Spherical | Infinite | −0.21 | Glass | | | |
| 13 | | Spherical | Infinite | −8.00 | | | | |
| 14 | Imaging Surface | Spherical | Infinite | 0.00 | | | | |

Note:
the reference wavelength is 555 nm

TABLE 4

Second Embodiment
Aspheric Coefficient

| Surface Number | 6 | 7 | 8 | 9 | 10 | 11 |
|---|---|---|---|---|---|---|
| K | 0.00E+00 | 0.00E+00 | 0.00E+00 | 0.00E+00 | 0.00E+00 | 0.00E+00 |
| A4 | −5.15E−03 | −2.13E−02 | 1.05E−03 | 2.48E−02 | −8.68E−03 | −1.99E−03 |
| A6 | −9.73E−04 | 4.23E−03 | 7.90E−03 | 1.18E−02 | 3.33E−03 | 5.72E−04 |
| A8 | 1.71E−04 | −2.22E−03 | −2.69E−03 | −2.98E−03 | 1.15E−04 | 5.47E−05 |
| A10 | −2.56E−06 | 4.25E−04 | 4.07E−04 | 4.26E−04 | −1.19E−04 | −3.04E−05 |
| A12 | 0.00E+00 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

Figure 6:
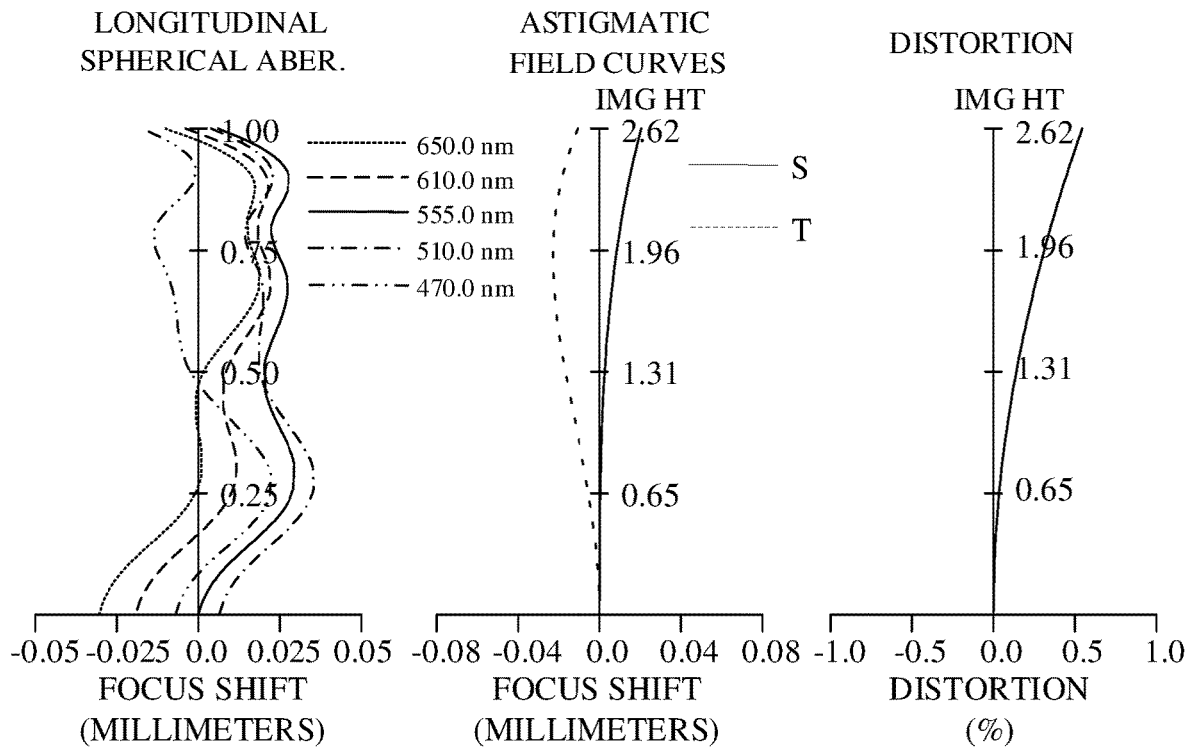
FIG. 6 is a graph showing longitudinal spherical aberration (mm), astigmatism (mm), and distortion (%) of the imaging lens according to the third embodiment.

According to the information of the various parameters provided as above, the following data can be derived.

a negative refractive power, a third lens L3 having a negative refractive power, and an infrared cut-off filter L4. In some embodiments, the imaging lens 100 further includes a prism arranged on an object side of the first lens L1. In addition, FIG. 6 is a graph showing longitudinal spherical aberration (mm), astigmatism (mm), and distortion (%) of the imaging lens 100 according to the third embodiment, where the astigmatism diagram and the distortion diagram are data diagrams at a reference wavelength.

An object side surface S1 of the first lens L1 is convex at an optical axis, an image side surface S2 of the first lens L1 is convex at the optical axis. The object side S1 of the first lens L1 is convex at its circumference, and the image side surface S2 of the first lens L1 is concave at its circumference. An object side surface S3 of the second lens L2 is convex at the optical axis, an image side surface S4 of the second lens L2 is concave at the optical axis. The object side surface S3 of the second lens L2 is concave at its circumference, and the image side surface S4 of the second lens L2 is convex at its circumference. An object side surface S5 of the third lens L3 is concave at the optical axis, an image side surface S6 of the third lens L3 is convex at the optical axis. The object side surface S5 of the third lens L3 is concave at its circumference, and the image side surface S6 of the third lens L3 is convex at its circumference.

The object side surfaces and the image side surfaces of the first lens L1, the second lens L2, and the third lens L3 are all aspherical.

In addition, the first lens L1, the second lens L2 and the third lens L3 are all made of plastic.

In the third embodiment, the effective focal length of the imaging lens 100 is indicated by f, and f=17.50 mm. The f-number is indicated by FNO, and FNO=4.9. The angle of field of view is indicated by FOV, and FOV=16.95 degrees (deg.). The distance from the object side surface S1 of the first lens L1 to the imaging surface S9 on the optical axis is indicated by TTL, and TTL=18.94 mm.

In addition, various parameters of the optical system 100 are shown in Table 5 and Table 6. Definitions of the various parameters can be obtained from the first embodiment, and which will not be repeated herein.

TABLE 5

Third Embodiment
f = 17.50 mm, FNO = 4.9, FOV = 16.95 degrees, TTL = 18.94 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Virtual Surface | Spherical | Infinite | 2.85 | | | | |
| 2 | Prism Surface | Spherical | Infinite | 2.50 | Glass | 1.52 | 64.17 | Infinite |
| 3 | Prism Surface | Spherical | Infinite | −2.50 | | | | |
| 4 | Prism Surface | Spherical | Infinite | −0.85 | | | | |
| 5 | Stop | Spherical | Infinite | 0.23 | | | | |
| 6 | First Lens | Aspherical | −10.31 | −1.04 | Plastic | 1.55 | 56.11 | 7.49 |
| 7 | | Aspherical | 6.54 | −0.03 | | | | |
| 8 | Second Lens | Aspherical | −3.04 | −0.42 | Plastic | 1.64 | 23.52 | −12.78 |
| 9 | | Aspherical | −2.10 | −1.04 | | | | |
| 10 | Third Lens | Aspherical | 3.70 | −1.50 | Plastic | 1.55 | 56.11 | −231.69 |
| 11 | | Aspherical | 4.36 | −6.70 | | | | |
| 12 | Infrared Cut-off Filter | Spherical | Infinite | −0.21 | Glass | | | |
| 13 | | Spherical | Infinite | −8.00 | | | | |
| 14 | Imaging Surface | Spherical | Infinite | 0.00 | | | | |

Note:
the reference wavelength is 555 nm

TABLE 6

Third Embodiment
Aspheric Coefficient

| Surface Number | 6 | 7 | 8 | 9 | 10 | 11 |
|---|---|---|---|---|---|---|
| K | 0.00E+00 | 0.00E+00 | 0.00E+00 | 0.00E+00 | 0.00E+00 | 0.00E+00 |
| A4 | −2.57E−03 | −1.61E−02 | 1.78E−02 | 3.64E−02 | −1.95E−02 | −6.88E−03 |
| A6 | −1.65E−03 | 2.26E−03 | 9.80E−03 | 1.33E−02 | 3.22E−03 | 4.34E−04 |
| A8 | −7.43E−05 | −1.68E−03 | −2.71E−03 | −2.31E−03 | 8.24E−05 | −1.93E−04 |
| A10 | 1.93E−05 | 3.23E−04 | 5.11E−04 | 2.72E−04 | −1.88E−04 | −1.22E−05 |
| A12 | 0.00E+00 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

According to the information of the various parameters provided as above, the following data can be derived.

| Third Embodiment | | | |
|---|---|---|---|
| f (mm) | 17.50 | TTL/\|f1\| | 2.53 |
| FNO | 4.9 | (f2 + f3)/CT2 | −575.32 |
| FOV (degree) | 16.95 | f23/f | −0.78 |
| TTL (mm) | 18.94 | R2/f1 | 0.87 |
| FNO*L | 17.54 | BFL (mm) | 14.91 |
| (ΣET*EPD)/f | 2.14 | TTL/SL | 3157.33 |
| f1/CT1 | 7.21 | ΣET(len)/TTL | 0.15 |
| TTL/\|f\| | 1.08 | ET12/f | 0.07 |
| | | TTL/Imgh | 7.23 |

Fourth Embodiment

Figure 7:
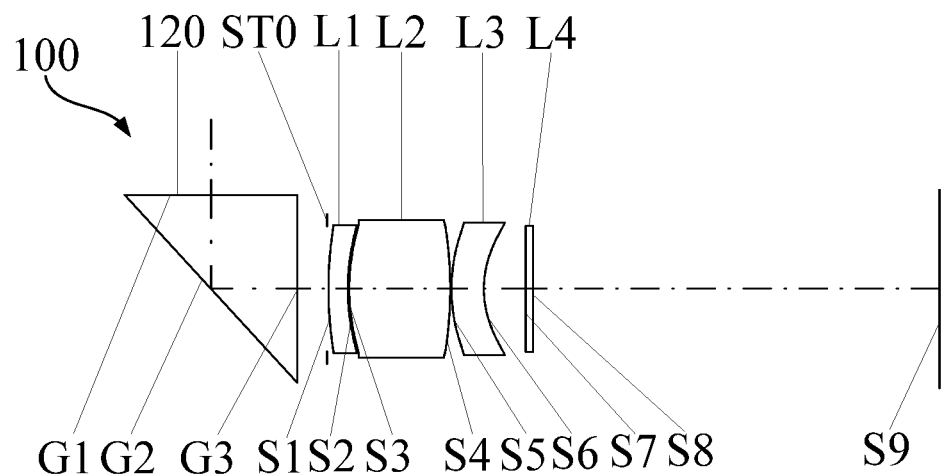
FIG. 7 is a schematic view of an imaging lens according to a fourth embodiment of the present disclosure.

Referring to the fourth embodiment shown in FIG. 7, the imaging lens 100 includes, successively in order from the object side to the image side, a stop STO, a first lens L1 having a negative refractive power, a second lens L2 having a positive refractive power, a third lens L3 having a negative refractive power, and an infrared cut-off filter L4.

Figure 8:
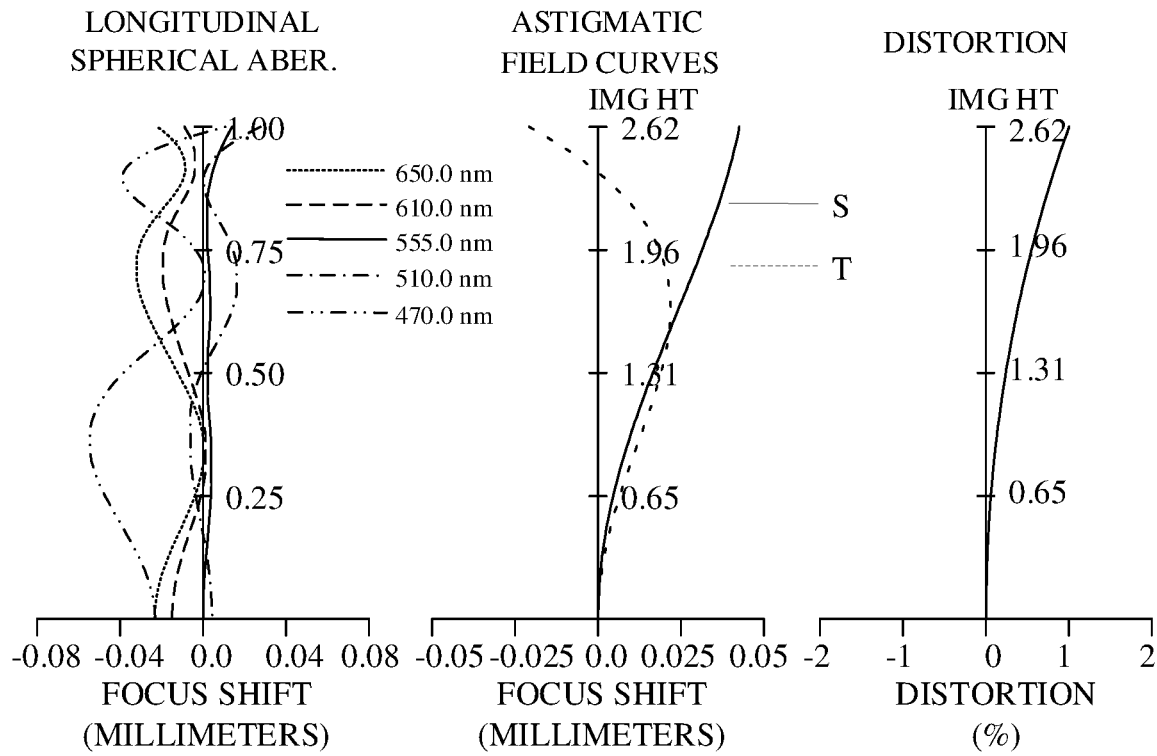
FIG. 8 is a graph showing longitudinal spherical aberration (mm), astigmatism (mm), and distortion (%) of the imaging lens according to the fourth embodiment.

In some embodiments, the imaging lens 100 further includes a prism arranged on an object side of the first lens L1. In addition, FIG. 8 is a graph showing longitudinal spherical aberration (mm), astigmatism (mm), and distortion (%) of the imaging lens 100 according to the fourth embodiment, where the astigmatism diagram and the distortion diagram are data diagrams at a reference wavelength.

An object side surface S1 of the first lens L1 is convex at an optical axis, an image side surface S2 of the first lens L1 is concave at the optical axis. The object side S1 of the first lens L1 is convex at its circumference, and the image side surface S2 of the first lens L1 is concave at its circumference. An object side surface S3 of the second lens L2 is convex at the optical axis, an image side surface S4 of the second lens L2 is convex at the optical axis. The object side surface S3 of the second lens L2 is convex at its circumference, and the image side surface S4 of the second lens L2 is convex at its circumference. An object side surface S5 of the third lens L3 is convex at the optical axis, an image side surface S6 of the third lens L3 is concave at the optical axis. The object side surface S5 of the third lens L3 is convex at its circumference, and the image side surface S6 of the third lens L3 is concave at its circumference.

The object side surfaces and the image side surfaces of the first lens L1, the second lens L2, and the third lens L3 are all aspherical.

In addition, the first lens L1, the second lens L2 and the third lens L3 are all made of plastic.

In the fourth embodiment, the effective focal length of the imaging lens 100 is indicated by f, and f=17.45 mm. The f-number is indicated by FNO, and FNO=5.25. The angle of field of view is indicated by FOV, and FOV=16.57 degrees (deg.). The distance from the object side surface S1 of the first lens L1 to the imaging surface S9 on the optical axis is indicated by TTL, and TTL=17.69 mm.

In addition, various parameters of the optical system 100 are shown in Table 7 and Table 8. Definitions of the various parameters can be obtained from the first embodiment, and which will not be repeated herein.

TABLE 7

Fourth Embodiment
f = 17.45 mm, FNO = 5.25, FOV = 16.57 degrees, TTL = 17.69 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | 1000 | | | | |
| 1 | Virtual Surface | Spherical | Infinite | 5.00 | | | | |
| 2 | Prism Surface | Spherical | Infinite | 2.50 | Glass | 1.52 | 64.17 | Infinite |
| 3 | Prism Surface | Spherical | Infinite | −2.50 | | | | |
| 4 | Prism Surface | Spherical | Infinite | −0.85 | | | | |
| 5 | Stop | Spherical | Infinite | −0.04 | | | | |
| 6 | First Lens | Aspherical | −9.11 | −0.56 | Plastic | 1.64 | 23.53 | −20.62 |
| 7 | | Aspherical | −5.27 | −0.04 | | | | |
| 8 | Second Lens | Aspherical | −5.12 | −2.93 | Plastic | 1.55 | 55.97 | 6.37 |
| 9 | | Aspherical | 8.66 | −0.03 | | | | |
| 10 | Third Lens | Aspherical | −4.28 | −0.94 | Plastic | 1.55 | 55.97 | −12.67 |
| 11 | | Aspherical | −2.44 | −1.21 | | | | |
| 12 | Infrared Cut-off Filter | Spherical | Infinite | −0.21 | Glass | | | |
| 13 | | Spherical | Infinite | −10.77 | | | | |
| 14 | Imaging Surface | Spherical | Infinite | −1.00 | | | | |

Note:
the reference wavelength is 555 nm

TABLE 7

Fourth Embodiment
Aspheric Coefficient

| Surface Number | 6 | 7 | 8 | 9 | 10 | 11 |
|---|---|---|---|---|---|---|
| K | 0.00E+00 | 0.00E+00 | 0.00E+00 | 0.00E+00 | 0.00E+00 | 0.00E+00 |
| A4 | 4.05E−04 | −1.67E−02 | −1.87E−02 | −9.01E−03 | −5.17E−03 | 1.09E−02 |

TABLE 7-continued

Fourth Embodiment
Aspheric Coefficient

| Surface Number | 6 | 7 | 8 | 9 | 10 | 11 |
|---|---|---|---|---|---|---|
| A6 | 3.16E−04 | 2.44E−02 | 2.81E−02 | 8.72E−03 | 6.24E−03 | −4.29E−03 |
| A8 | 7.04E−04 | −8.62E−03 | −1.08E−02 | −5.30E−03 | −3.91E−03 | 4.55E−03 |
| A10 | −6.80E−04 | −1.26E−03 | −6.29E−04 | 1.50E−03 | 9.00E−04 | −2.93E−03 |
| A12 | 2.32E−04 | 1.20E−03 | 1.07E−03 | −1.43E−04 | 4.37E−05 | 1.14E−03 |
| A14 | −2.74E−05 | −1.64E−04 | −1.48E−04 | 6.13E−07 | −1.71E−05 | −1.54E−04 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

According to the information of the various parameters provided as above, the following data can be derived

| Fourth Embodiment | | | |
|---|---|---|---|
| f (mm) | 17.45 | TTL/|f1| | 0.86 |
| FNO | 5.25 | (f2 + f3)/CT2 | −2.15 |
| FOV (degree) | 16.57 | f23/f | 0.50 |
| TTL (mm) | 17.69 | R2/f1 | 0.26 |
| FNO*L | 17.75 | BFL (mm) | 12.67 |
| (ΣET*EPD)/f | 1.09 | TTL/SL | 92.56 |
| f1/CT1 | −36.82 | ΣET(len)/TTL | 0.24 |
| TTL/|f| | 1.01 | ET12/f | 0.18 |
| | | TTL/Imgh | 6.75 |

Fifth Embodiment

Figure 9:
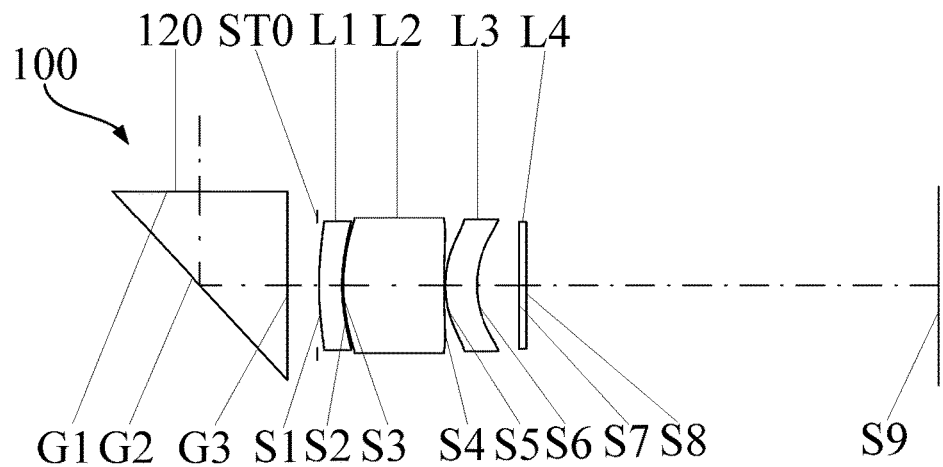
FIG. 9 is a schematic view of an imaging lens according to a fifth embodiment of the present disclosure.
Figure 10:
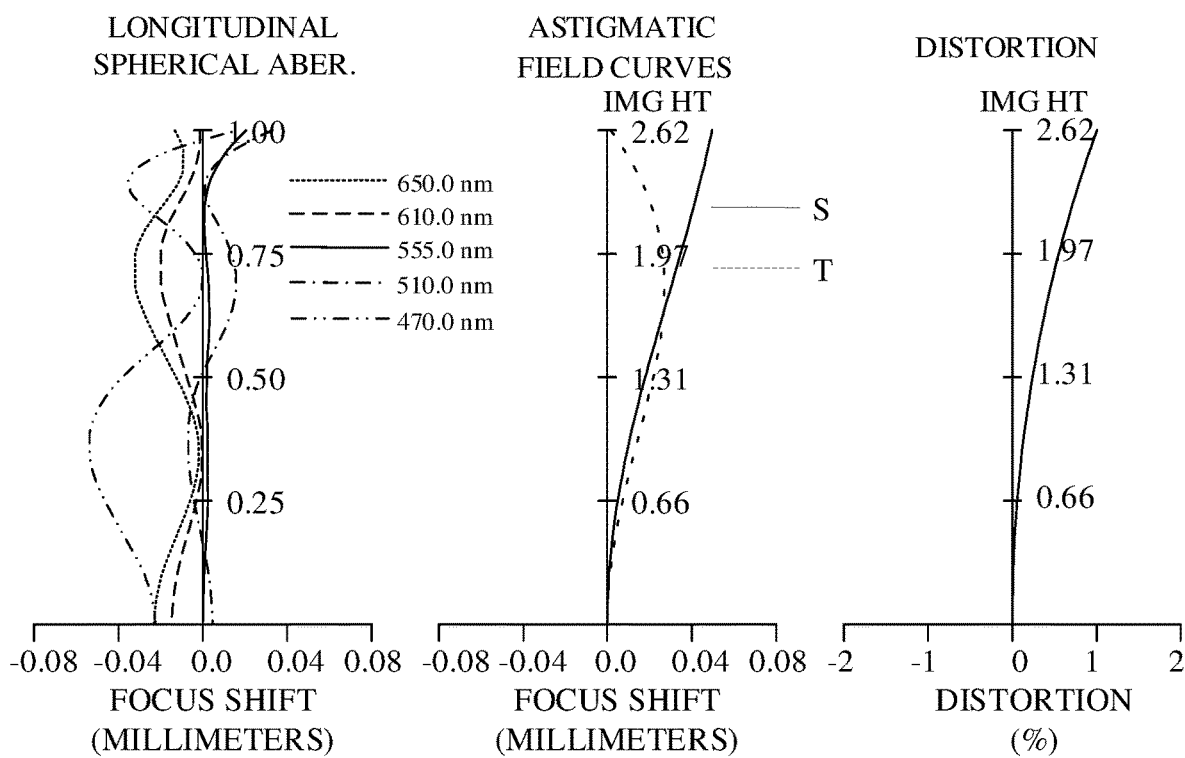
FIG. 10 is a graph showing longitudinal spherical aberration (mm), astigmatism (mm), and distortion (%) of the imaging lens according to the fifth embodiment.

Referring to the fifth embodiment shown in FIG. 9, the imaging lens 100 includes, successively in order from the object side to the image side, a stop STO, a first lens L1 having a negative refractive power, a second lens L2 having a positive refractive power, a third lens L3 having a positive refractive power, and an infrared cut-off filter L4. In some embodiments, the imaging lens 100 further includes a prism arranged on an object side of the first lens L1. In addition, FIG. 10 is a graph showing longitudinal spherical aberration (mm), astigmatism (mm), and distortion (%) of the imaging lens 100 according to the fifth embodiment, where the astigmatism diagram and the distortion diagram are data diagrams at a reference wavelength.

An object side surface S1 of the first lens L1 is convex at an optical axis, an image side surface S2 of the first lens L1 is concave at the optical axis. The object side S1 of the first lens L1 is convex at its circumference, and the image side surface S2 of the first lens L1 is concave at its circumference. An object side surface S3 of the second lens L2 is convex at the optical axis, an image side surface S4 of the second lens L2 is concave at the optical axis. The object side surface S3 of the second lens L2 is convex at its circumference, and the image side surface S4 of the second lens L2 is convex at its circumference. An object side surface S5 of the third lens L3 is convex at the optical axis, an image side surface S6 of the third lens L3 is concave at the optical axis. The object side surface S5 of the third lens L3 is convex at its circumference, and the image side surface S6 of the third lens L3 is concave at its circumference.

The object side surfaces and the image side surfaces of the first lens L1, the second lens L2, and the third lens L3 are all aspherical.

In addition, the first lens L1, the second lens L2 and the third lens L3 are all made of plastic.

In the fifth embodiment, the effective focal length of the imaging lens 100 is indicated by f, and f=17.40 mm. The f-number is indicated by FNO, and FNO=5.25. The angle of field of view is indicated by FOV, and FOV=16.62 degrees (deg.). The distance from the object side surface S1 of the first lens L1 to the imaging surface S9 on the optical axis is indicated by TTL, and TTL=17.67 mm.

In addition, various parameters of the optical system 100 are shown in Table 9 and Table 10. Definitions of the various parameters can be obtained from the first embodiment, and which will not be repeated herein.

TABLE 9

Fifth Embodiment
f = 17.40 mm, FNO = 5.25, FOV = 16.62 degrees, TTL = 17.67 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | 1000.00 | | | | |
| 1 | Virtual Surface | Spherical | Infinite | 5.00 | | | | |
| 2 | Prism Surface | Spherical | Infinite | 2.50 | Glass | 1.52 | 64.17 | Infinite |
| 3 | Prism Surface | Spherical | Infinite | −2.50 | | | | |
| 4 | Prism Surface | Spherical | Infinite | −0.85 | | | | |
| 5 | Stop | Spherical | Infinite | −0.04 | | | | |
| 6 | First Lens | Aspherical | −8.18 | −0.66 | Plastic | 1.64 | 23.53 | −20.39 |
| 7 | | Aspherical | −4.88 | −0.04 | | | | |
| 8 | Second Lens | Aspherical | −5.01 | −2.87 | Plastic | 1.55 | 55.97 | 10.63 |
| 9 | | Aspherical | −29.35 | −0.03 | | | | |
| 10 | Third Lens | Aspherical | −2.60 | −0.90 | Plastic | 1.55 | 55.97 | 74.01 |
| 11 | | Aspherical | −2.44 | −1.21 | | | | |
| 12 | Infrared | Spherical | Infinite | −0.21 | Glass | | | |

TABLE 9-continued

Fifth Embodiment
f = 17.40 mm, FNO = 5.25, FOV = 16.62 degrees, TTL = 17.67 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 13 | Cut-off Filter | Spherical | Infinite | −10.75 | | | | |
| 14 | Imaging Surface | Spherical | Infinite | −1.00 | | | | |

Note:
the reference wavelength is 555 nm

TABLE 10

Fifth Embodiment
Aspheric Coefficient

| Surface Number | 6 | 7 | 8 | 9 | 10 | 11 |
|---|---|---|---|---|---|---|
| K | 0.00E+00 | 0.00E+00 | 0.00E+00 | 0.00E+00 | 0.00E+00 | 0.00E+00 |
| A4 | 3.00E−03 | −1.30E−02 | −2.02E−02 | −3.64E−03 | −4.06E−03 | −5.38E−03 |
| A6 | 4.49E−04 | 2.45E−02 | 2.78E−02 | 8.84E−03 | 8.43E−03 | −2.27E−03 |
| A8 | 7.04E−04 | −8.65E−03 | −1.09E−02 | −5.28E−03 | −3.74E−03 | 5.74E−03 |
| A10 | −7.15E−04 | −1.32E−03 | −5.59E−04 | 1.56E−03 | 1.18E−03 | −3.40E−03 |
| A12 | 2.32E−04 | 1.23E−03 | 1.08E−03 | −1.33E−04 | −7.90E−05 | 1.38E−03 |
| A14 | −2.63E−05 | −1.69E−04 | −1.53E−04 | −2.65E−06 | 6.77E−06 | −2.00E−04 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

According to the information of the various parameters provided as above, the following data can be derived.

Fifth Embodiment

| | | | |
|---|---|---|---|
| f (mm) | 17.40 | TTL/|f1| | 0.87 |
| FNO | 5.25 | (f2 + f3)/CT2 | 29.53 |
| FOV (degree) | 16.62 | f23/f | 0.49 |
| TTL (mm) | 17.67 | R2/f1 | 0.24 |
| FNO*L | 17.65 | BFL (mm) | 12.61 |
| (ΣET*EPD)/f | 1.09 | TTL/SL | 93.43 |
| f1/CT1 | −30.99 | ΣET(len)/TTL | 0.24 |
| TTL/|f| | 1.02 | ET12/f | 0.19 |
| | | TTL/Imgh | 6.75 |

Figure 11:
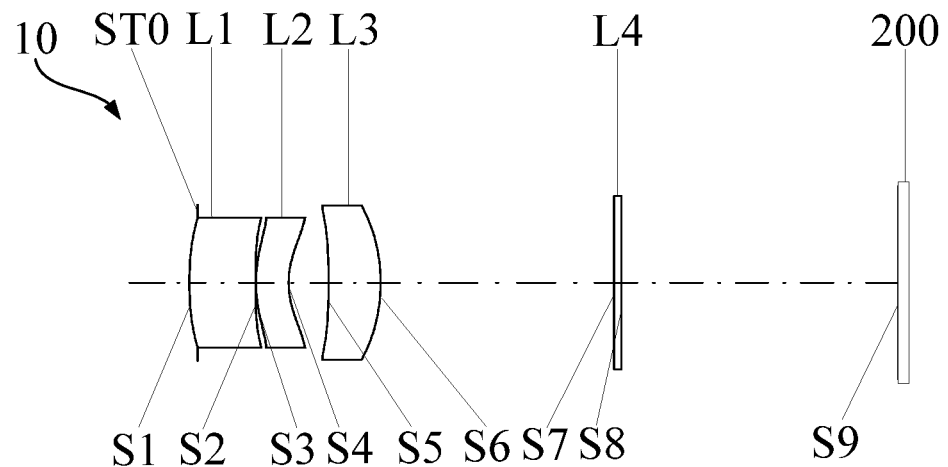
FIG. 11 is a schematic view of a camera module according to an embodiment of the present disclosure.

Referring to FIG. 11, an imaging lens 100 and a photosensitive element 200 are assembled to form a camera module 10. The photosensitive element 200 is arranged on the image side of the imaging lens 100. Preferably, the photosensitive element 200 is arranged on the imaging surface S9. The photosensitive element 200 may be a Charge Coupled Device (CCD) or a Complementary Metal Oxide Semiconductor (CMOS). It should be noted that, in some embodiments, the imaging lens 100 does not include an infrared cut-off filter L4. As such, the infrared cut-off filter L4 can be fixedly arranged with the photosensitive element 200, and is arranged on the image side of the imaging lens 100 together with the photosensitive element 200 during assembly.

In some embodiments, a distance between the photosensitive element 200 and the imaging lens 100 is fixed. As such, the camera module 10 is a fixed focus module. In other embodiments, a voice coil motor is provided to enable the photosensitive element 210 to move relative to the lenses in the imaging lens 100. In other embodiments, a fixing member can also be provided to fix the stop STO, the first lens L1, the second lens L2, and the third lens L3. In this case, a voice coil motor is provided on the fixing member to drive the above lenses and the stop STO to move relative to the photosensitive element 200, thereby achieving the focusing.

Figure 12:
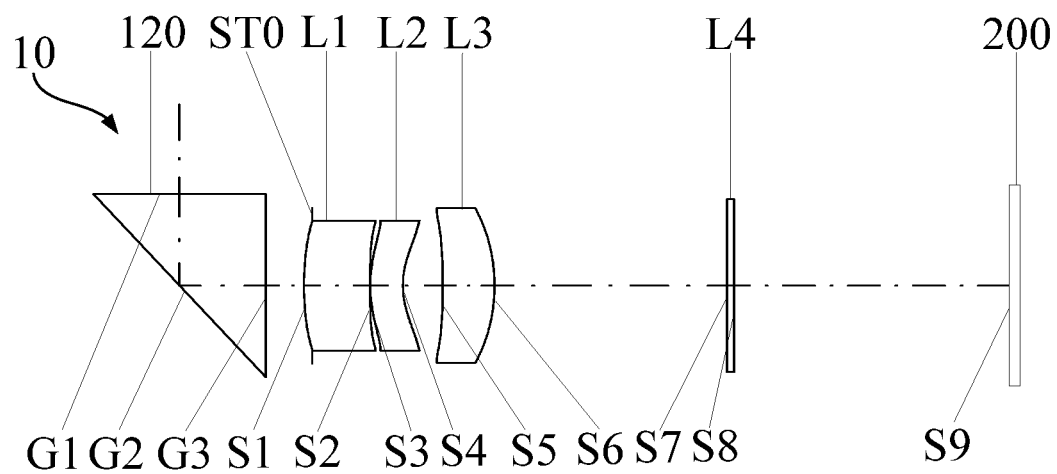
FIG. 12 is a schematic view of a camera module according to another embodiment of the present disclosure.

Referring to FIGS. 11 and 12, It should be noted that, according to actual manufacture requirements, in some embodiments, the camera module 10 is not provided with a reflector 120 (such as a prism or a flat reflector). As such, the light carrying the information of the subject directly enters the lens group (the first lens L1, the second lens L2, and the third lens L3). In other embodiments, the camera module 10 may be provided with a reflector 120. As such, the light carrying the information of the subject is reflected by the reflector 120 and then enters the lens group.

In some embodiments, the reflector 120 and the lens group can be assembled to form the imaging lens 100. The positions of the reflector 120 and the lenses can be corrected during assembly. Therefore, during the subsequent assembly of the imaging lens 100 and the photosensitive element 200, it is possible to avoid correcting the positional relationship between the reflector 120 and the lens group, thereby reducing the difficulty of subsequent assembly.

In some embodiments, the imaging lens 100 does not include the reflector 120. As such, the reflector 120 may be mounted on the object side of the first lens L1 when the imaging lens 100 and the photosensitive element 200 are assembled. The reflector 120 reflects the light carrying the information of the subject into the lens group.

Figure 13:
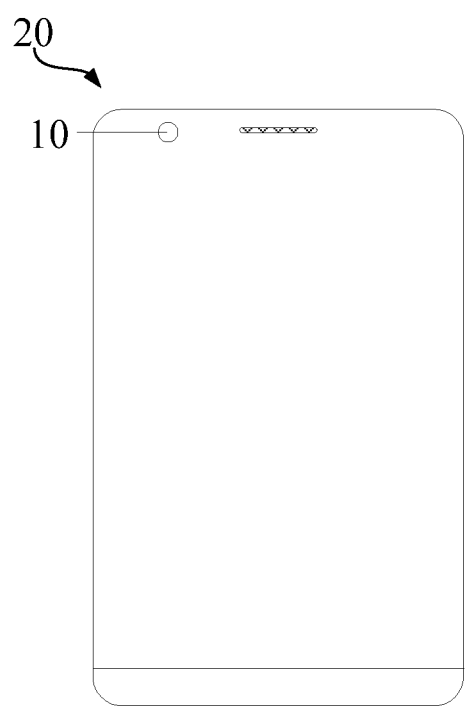
FIG. 13 is a schematic view of an electronic device according to an embodiment of the present disclosure.

Referring to FIG. 13, the camera module 10 may be applied to an electronic device 20. Specifically, the electronic device 20 is a smart phone, a tablet computer, an electronic watch, a Personal Digital Assistant (PDA), a game console, a personal computer (PC), and the like. By adopting the camera module 10, the electronic device 20 not only possesses the telephoto characteristics, but also has the amount of light that is compatible with the focal length range, so as to improve the dark picture imaged by the conventional telephoto lens, and improve the imaging quality during telephoto capturing. Therefore, the electronic device 20 has excellent telephoto camera performance. In some embodiments, by providing the reflector, the electronic device 20 will further have the function of periscope capturing.

The "electronic device" used in the embodiments of the present disclosure may include, but is not limited to, a device configured to be connected via a wired line connection (such as via a public switched telephone network (PSTN), digital subscriber line (DSL), digital cable, direct cable connection, and/or another data connection/network) and/or receive/transmit communication signals via an wireless interface (for example, for a cellular network, a wireless local area network (WLAN), a digital TV network such as digital video broadcasting handheld (DVB-H) network, a satellite network, an amplitude modulation-frequency modulation (AM-FM) broadcast transmitter, and/or another communication terminal). The electronic device configured to communicate via the wireless interface may be referred to as a "wireless communication terminal", a "wireless terminal" and/or a "mobile terminal". Examples of the mobile terminal include, but is not limited to satellite or cellular phones; personal communication system (PCS) terminals that can combine cellular radio phones with data processing, fax, and data communication capabilities. Examples of the mobile terminal can include the radio phone, the pager, the Internet/intranet access, the Web browser, the memo pad, calendar, and/or a personal digital assistant (PDA) of the global positioning system (GPS) receiver; and conventional laptop and/or handheld receiver or other electronic device including a radio phone transceiver.

In the description of the present disclosure, it should be understood that orientation or positional conditions indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features indicated. Thus, the features defined with "first" and "second" may include at least one of the features explicitly or implicitly. In the description of the present disclosure, the meaning of "plurality" is at least two, for example, two, three or the like, unless explicitly and specifically defined otherwise.

In the present disclosure, unless explicitly specified and defined otherwise, terms "mounting", "connecting", "connected", and "fixing" should be understood in a broad sense. For example, it may be a fixed connection or a detachable connection, or an integration; may be a mechanical connection or electrical connection; may be a direct connection, or may be a connection through an intermediate medium, may be the communication between two elements or the interaction condition between two elements, unless explicitly defined otherwise. The specific meanings of the above terms in the present disclosure can be understood by one of those ordinary skills in the art according to specific circumstances.

In the present disclosure, unless expressly specified and defined otherwise, a first feature being "on" or "below" a second feature may mean that the first feature is in direct contact with the second feature, or may mean that the first feature is indirectly contact with the second feature through an intermediate medium. Moreover, the first feature being "above", "top" and "upside" on the second feature may mean that the first feature is directly above or obliquely above the second feature, or simply mean that the level of the first feature is higher than that of the second feature. The first feature being "below", "under" and "beneath" the second feature may mean that the first feature is directly below or obliquely below the second feature, or simply mean that the level of the first feature is smaller than that of the second feature.

In the description of this specification, descriptions referring to terms "one embodiment", "some embodiments", "examples", "specific examples", or "some examples" and the like mean that specific features, structures, materials, or characteristics described in conjunction with the embodiment or example are included in at least one embodiment or example of the present disclosure. In this specification, schematic representations of the above terms do not necessarily refer to the same embodiment or example. Moreover, the described specific features, structures, materials, or characteristics can be combined in any one or more embodiments or examples in a suitable manner. In addition, if there is no contradiction, the different embodiments or examples and the features of the different embodiments or examples described in this specification can be combined and incorporated by those skilled in the art.

The technical features of the above-mentioned embodiments can be combined arbitrarily. In order to simply the description, all possible combinations of the technical features in the above-mentioned embodiments are not described. However, as long as there is no contradiction in the combinations of these technical features, they should be considered to be fallen into the range described in the present specification.

Only several embodiments of the present disclosure are illustrated in the above-mentioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. An imaging lens, comprising, successively in order from an object side to an image side:
   a first lens having a refractive power, an object side surface of the first lens being convex at an optical axis;
   a second lens having a refractive power, an object side surface of the second lens being convex at the optical axis; and
   a third lens having a refractive power;
   wherein the imaging lens satisfies the following condition:

$FNO*L>15.5;$ wherein FNO is an f-number of the imaging lens, L is an aperture diameter of the first lens, and a unit of L is mm;
   wherein the imaging lens satisfies the following condition;

$4 < TTL/Imgh < 8;$ wherein TTL is a distance from the object side surface of the first lens to an imaging surface of the imaging lens on the optical axis, and Imgh is half of a diagonal length of an image height.

2. The imaging lens according to claim 1, further comprising a stop and satisfying the following condition:

$1 < (\Sigma ET*EPD)/f < 3;$ wherein $\Sigma ET$ is a distance from the stop to a portion of an image side surface of the third lens at a maximum effective radius in a direction parallel to the optical axis, EPD is an entrance pupil diameter of the imaging lens, and f is an effective focal length of the imaging lens.

3. The imaging lens according to claim 1, further satisfying the following condition:

$-37 < f1/CT1 < 22;$ wherein f1 is a focal length of the first lens, and CT1 is a thickness of the first lens at the optical axis.

4. The imaging lens according to claim 1, further satisfying the following condition:

$1.0 < TTL/|f| < 1.2;$ wherein f is an effective focal length of the imaging lens.

5. The imaging lens according to claim 1, further satisfying the following condition:

$0.7 < TTL/|f1| < 2.7;$ wherein TTL is a distance from the object side surface of the first lens to an imaging surface of the imaging lens on the optical axis, and f1 is a focal length of the first lens.

6. The imaging lens according to claim 1, further satisfying the following condition:

$-585 < (f2+f3)/CT2 < 30;$ wherein f2 is a focal length of the second lens, f3 is a focal length of the third lens, and CT2 is a thickness of the second lens at the optical axis.

7. The imaging lens according to claim 1, further satisfying the following condition:

$-0.8 < f23/f < 10;$ wherein f23 is a combined focal length of the second lens and the third lens, and f is an effective focal length of the imaging lens.

8. The imaging lens according to claim 1, further satisfying the following condition:

$-5 < R2/f1 < 5;$ wherein R2 is a radius of curvature of an image side surface of the first lens at the optical axis, and f1 is a focal length of the first lens.

9. The imaging lens according to claim 1, further satisfying the following condition:

$11 < BFL < 16;$ wherein BFL is a shortest distance from an image side surface of the third lens to an imaging surface of the imaging lens in a direction parallel to the optical axis, and a unit of BFL is mm.

10. The imaging lens according to claim 1, further comprising a stop and satisfying the following condition:

$91 < TTL/SL < 3450;$ wherein TTL is a distance from the object side surface of the first lens to an imaging surface of the imaging lens on the optical axis, and SL is a distance from the stop to a portion of the object side surface of the first lens at a maximum effective radius in a direction parallel to the optical axis.

11. The imaging lens according to claim 1, further satisfying the following condition:

$0.13 < \Sigma ET(len)/TTL < 0.25;$ wherein $\Sigma ET(len)$ is a sum of thicknesses of the first lens, the second lens, and the third lens at a respective maximum effective radius thereof, and TTL is a distance from the object side surface of the first lens to an imaging surface of the imaging lens on the optical axis.

12. The imaging lens according to claim 1, further satisfying the following condition:

$0.06 < ET12/f < 0.2;$ wherein ET12 is a sum of thicknesses of the first lens and the second lens at a respective maximum effective radius thereof, and f is an effective focal length of the imaging lens.

13. The imaging lens according to claim 1, wherein the object side surface of the first lens is convex at a circumference thereof, and an image side surface of the first lens is concave at a circumference thereof.

14. The imaging lens according to claim 1, wherein object side surfaces and image side surfaces of the first lens, the second lens, and the third lens are aspherical.

15. The imaging lens according to claim 1, further comprising a stop arranged on an object side of the first lens.

16. The imaging lens according to claim 1, further comprising a reflector arranged on an object side of the first lens, wherein light carrying information of a subject is capable of being reflected by the reflector to the first lens.

17. A camera module, comprising:
a photosensitive element; and
the imaging lens according to claim 1,
wherein the photosensitive element is arranged on the image side of the imaging lens.

18. The camera module according to claim 17, further comprising an infrared cut-off filter arranged between the imaging lens and the photosensitive element.

19. An electronic device, comprising the camera module according to claim 18.

* * * * *